US008086957B2

(12) United States Patent
Bauchot et al.

(10) Patent No.: US 8,086,957 B2
(45) Date of Patent: Dec. 27, 2011

(54) METHOD AND SYSTEM TO SELECTIVELY SECURE THE DISPLAY OF ADVERTISEMENTS ON WEB BROWSERS

(75) Inventors: Frederic Bauchot, Saint-Jeannet (FR); David Loupia, Carros (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/420,184

(22) Filed: Apr. 8, 2009

(65) Prior Publication Data
US 2009/0292984 A1 Nov. 26, 2009

(30) Foreign Application Priority Data
May 21, 2008 (EP) .................................... 08305188

(51) Int. Cl.
*G06F 17/00* (2006.01)
(52) U.S. Cl. ........ 715/234; 715/239; 715/255; 715/271; 715/272; 715/273; 715/277
(58) Field of Classification Search .................. 715/234, 715/239, 255, 271–273, 277
See application file for complete search history.

(56) References Cited

U.S. PATENT DOCUMENTS

| | | | |
|---|---|---|---|
| 6,393,407 B1* | 5/2002 | Middleton et al. | 705/14.73 |
| 7,409,636 B2* | 8/2008 | Meijer et al. | 715/255 |
| 7,617,294 B1* | 11/2009 | Harding | 709/217 |
| 2002/0191867 A1* | 12/2002 | Le et al. | 382/300 |
| 2003/0023640 A1* | 1/2003 | Challenger et al. | 707/530 |
| 2004/0268249 A1* | 12/2004 | Fennelly et al. | 715/523 |
| 2005/0022116 A1* | 1/2005 | Bowman et al. | 715/513 |
| 2006/0206919 A1* | 9/2006 | Montgomery et al. | 726/2 |
| 2007/0038643 A1* | 2/2007 | Epstein | 707/10 |
| 2007/0206221 A1* | 9/2007 | Wyler et al. | 358/1.15 |
| 2011/0173528 A1* | 7/2011 | Zunger | 715/234 |

OTHER PUBLICATIONS

Hegaret et al., "What is the Document Object Model?" Apr. 7, 2004, W3C.*
"XML Parser," Apr 20, 2008, W3Schools.com.*
Gupta et al., "DOM-based Content Extraction of HTML Documents," May 20-24, 2003, WWW2003, pp. 207-214.*
Choi et al., "An Approach to Dynamic Division of Web Pages for Displaying on Small Screen Devices," Dec. 21, 2003, 4th WSEAS International Conference on Mathematics and Computers in Business and Economics (MCBE'03).*

* cited by examiner

*Primary Examiner* — Chau Nguyen
(74) *Attorney, Agent, or Firm* — Andrea Bauer; Hoffman Warnick LLC

(57) ABSTRACT

A method and system to selectively secure the display of advertisements on web browsers. A method in accordance with an embodiment includes: defining a particular displayed area of the interpreted markup file; obtaining the DOM tree of the interpreted markup file, the DOM tree comprising parent and child nodes, each node being associated with displayable elements; identifying in the DOM tree a set of child nodes whose displayable elements comprise the particular displayed area; identifying in the DOM tree a first parent node comprising the set of child nodes; converting displayable elements associated with the identified first parent node to an image; generating a second parent node comprising the image; and modifying the DOM tree into a modified DOM tree by deleting the identified set of child nodes and by replacing the identified first parent node by the second parent node.

17 Claims, 9 Drawing Sheets

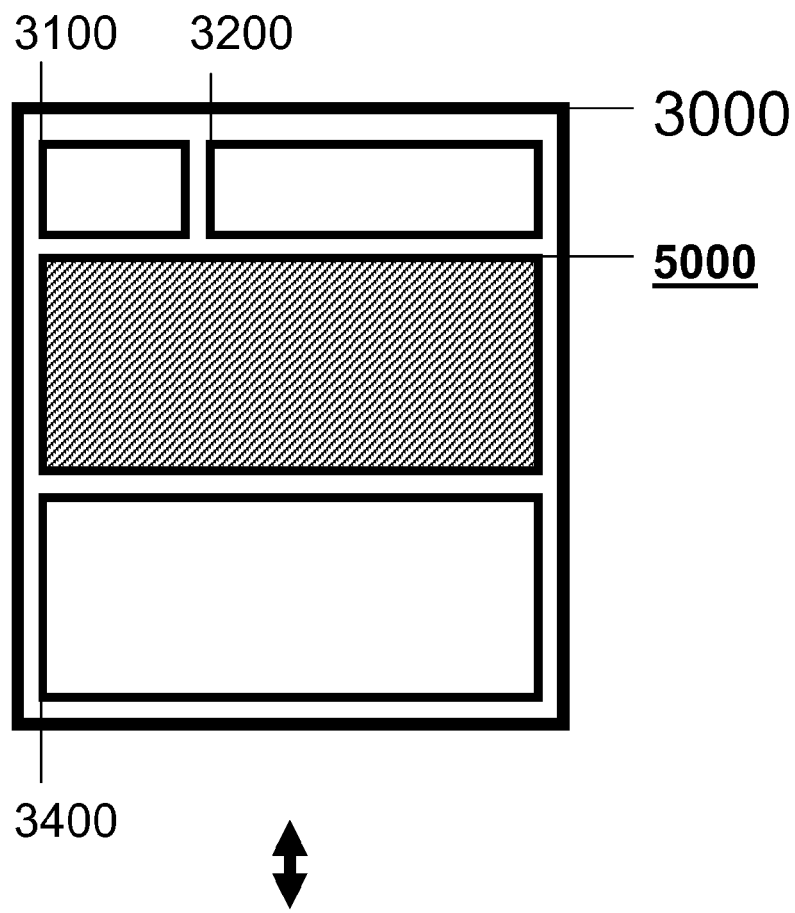
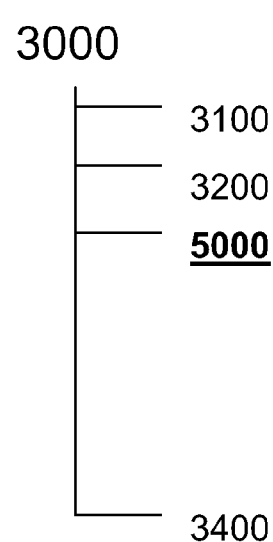

METHOD AND SYSTEM TO SELECTIVELY SECURE THE DISPLAY OF ADVERTISEMENTS ON WEB BROWSERS

FIELD OF THE INVENTION

The present invention relates generally to data processing, and more particularly to systems and methods for web browsing.

BACKGROUND ART

The business model of many companies on the Internet often depends on advertisement displays on the client web browser. The rise of solutions enabling the blocking or skipping of such ads greatly endangers this mainstream source of revenue.

Advertisements represent a major source of revenue for many websites and companies. In the case wherein ads are massively rejected (and even "well targeted", effective or informative ads of major companies), there will not be free content or services anymore. For now, only the most technically proficient users are aware of such adblocking techniques but a default integration of such tools in mass-market web browsers would result in huge losses for companies whose business models rely on advertisement. It is then of the highest importance to be able to find a way to secure the display of advertisements on web browsers and to avoid the possible death of advertising in today's digital networks and their associated ever growing adblocking capabilities. Indeed, a complete shift away from advertising may occur, with the growing use of adblocking techniques (so called adblockers or ad blockers).

Advertisements are text areas, still images, animated images, or even videos embedded in web pages. When a member of the advertising audience (referred to as a "viewer" or "user" without loss of generality) selects one of these ads by clicking on it, embedded hypertext links typically direct the viewer to the advertiser's Web site ("click-through" process).

It appears that more and more consumers are tired of intrusive marketing. They are saturated by highly distracting ads, though some industry players try to leverage "non-annoying" and "informative" ads. Indeed, there are very few simple, easy to read, non-intrusive, text advertisements. Instead, ads are often flash or animated gif banners that users feel to be too invasive (pop-ups, pop-unders, and the like sometimes cover the desirable contents) and flashing graphics make it very hard to read real text elsewhere on the page. Further, many times ads that are delivered are not appropriate (so-called targeted ads often fail), which distract the reader with noise. Most of the time, the targeting of users implies the tracking of habits and threatens privacy.

For all above reasons, more and more users use so-called adblockers (or ad blockers). From users' point of view, adblocking benefits include cleaner looking web pages, lower resource-usage (bandwidth) and the loading of pages is the to be speeded-up (many pages are designed to load heavy ads first). The state of the art comprises many adblocking techniques enabling the skipping or removal of advertisements on web browsers, such as pure text browsers, pop-up blockers (or pop-under), blacklists of URLs of ad servers, text filtering tools (based on keywords, to prevent ad files from loading), script blockers, use of CSS rules (to hide specific HTML and XHTML elements), etc.

Adblocking techniques are not solely involved. The use of extraction techniques for building personalized web pages, the use of RSS and the use of mashups also induce the skipping of advertisements. The use of personalized web pages enables the extraction of precise content areas and the gathering of the extracted content in personalized pages. Thereafter, the user does not need to visit the original page again, thus skipping advertisements, if any. A similar technique relies on loading entire pages and displaying them only with frames and/or <DIV> tags, hiding unwanted content. This last possibility also presents the drawback of leaving the number of unique visitors unchanged (from the advertiser's point of view), though the content is not even displayed to the user. With RSS feeds (RSS stands for "Really Simple Syndication"), similar mechanisms do operate. Indeed, the rise of RSS feeds has deeply changed the nature of the Internet, which now comprises a flow of data rather than just a stock of data. It is important to notice that according to this RSS model, content providers do control feeds, meaning they can choose what content to offer to theirs subscribers, trough RSS feeds. Again, thanks to emerging mechanisms, it is now possible for users to freely extract parts of the web content, without any limitations. In other words, web users do not need to visit bottleneck pages anymore (home pages or portals containing lots of ads). In this context, content providers may be reduced to providers of raw data, with very few choices for monetizing their business. For example, a technique (sometimes called RSS Generator) enables users to extract feeds from any web page. Yet other techniques allow not only the gathering of RSS feeds, but also the combining of RSS feeds (RSS Remixer tools enable filtering, searching, mixing, etc). There have been some attempts to embed targeted ads into syndicated feeds (an ad would be served in an RSS item or blog post containing keywords that an advertiser has preselected) but text filtering (keywords-based—or involving other techniques) can also defeat this process. Further, the use of so-called mashups also poses a threat to online advertising. Thanks to APIs (Application Programming Interfaces), applications themselves can also be aggregated and, in particular, advertisements can be removed during the remixing of content.

On the reverse side (i.e., securing the display of advertisements), it appears that there are very few technical solutions available. A known approach consists in URL address scrambling techniques, in order to bypass URLs blacklists. This solution is not always efficient because of the reactivity of possible collaborative filtering (like peer-based anti-spam techniques). The use of randomized addresses also induces limitations (learning capabilities). Due to some bugs, some websites can access chrome:// addresses in SCRIPT and IMG tags and detect adblocking add-ons installed on browsers. Then, they can refuse to serve the client but these bugs are progressively fixed and adblockers implement work-around for these bugs.

Aside these common technical approaches, there are only non-technical methods. For example, permission marketing methods are tested (indeed, users may target ads instead of ads targeting users), but these methods do not apply well to mass markets. Other methods based on users profiling are tried by advertisers or their partners to deliver better perceived forms of advertisements, but it poses privacy threats. If no reliable solution emerges to secure the display of advertisements, advertising formats may evolve to these contextual, interactive, permission-based and targeted messaging to retain consumer's attention and to help minimize both irritation and "tuning out." A few content or service providers also try to warn their users on damages implied by the use of adblocking techniques by arguing that it takes revenue out of the people that work hard to provide them contents and services. Sometimes they require a specific license agreement for visiting their websites. In conclusion, none of these (non-technical) methods succeed to effectively act as countermeasures to adblocking techniques and/or the use of RSS feeds and/or the use of personalized web pages, and in fine, to secure revenues streams.

There is an urgent need for a method enabling to secure the display of advertisements on web browsers, and more generally for markup file viewers.

SUMMARY OF THE INVENTION

The present invention provides methods and systems for securing the display of advertisements.

A first aspect of the invention includes a method of modifying a document object model (DOM) tree of an interpreted markup file comprising one or more displayable elements, the method comprising: defining a particular displayed area of the interpreted markup file; obtaining the DOM tree of the interpreted markup file, the DOM tree comprising at least one parent node and a plurality of child nodes, each node being associated with at least one of the displayable elements; identifying in the DOM tree a set of the child nodes whose displayable elements comprise at least a part of the particular displayed area; identifying in the DOM tree a first parent node comprising the set of child nodes; converting all displayable elements associated with the identified first parent node to a master image; generating a second parent node comprising the master image; and modifying the DOM tree into a modified DOM tree by deleting the identified set of child nodes and by replacing the identified first parent node by the second parent node.

A second aspect of the invention includes a computer program stored on a computer usable medium for modifying a document object model (DOM) tree of an interpreted markup file comprising one or more displayable elements, the computer program comprising instructions for: defining a particular displayed area of the interpreted markup file; obtaining the DOM tree of the interpreted markup file, the DOM tree comprising at least one parent node and a plurality of child nodes, each node being associated with at least one of the displayable elements; identifying in the DOM tree a set of the child nodes whose displayable elements comprise at least a part of the particular displayed area; identifying in the DOM tree a first parent node comprising the set of child nodes; converting all displayable elements associated with the identified first parent node to a master image; generating a second parent node comprising the master image; and modifying the DOM tree into a modified DOM tree by deleting the identified set of child nodes and by replacing the identified first parent node by the second parent node.

A third aspect of the invention includes a system for modifying a document object model (DOM) tree of an interpreted markup file comprising one or more displayable elements, the system being configured to: define a particular displayed area of the interpreted markup file; obtain the DOM tree of the interpreted markup file, the DOM tree comprising at least one parent node and a plurality of child nodes, each node being associated with at least one of the displayable elements; identify in the DOM tree a set of the child nodes whose displayable elements comprise at least a part of the particular displayed area; identify in the DOM tree a first parent node comprising the set of child nodes; convert all displayable elements associated with the identified first parent node to a master image; generate a second parent node comprising the master image; and modify the DOM tree into a modified DOM tree by deleting the identified set of child nodes and by replacing the identified first parent node by the second parent node.

As an overview, embodiments of the invention use a valuable combination of several techniques to secure the display of one or a plurality of particular regions of interest in an interpreted or executed markup file including, for example, techniques of rewriting the DOM tree, use of image generations and alterations which leverage the technological limitations of image recognition and text analysis techniques (such as OCR), and use of a scripting language code which preserves user interactivity which may have been lost for some modified parts of the markup file.

Among many advantages, an embodiment of the invention defeats most existing image recognition technologies and defeats most existing semantic or text analysis techniques (which technologies could possibly be used to block or skip advertisements). In other words, embodiments of the invention can be used to secure the display of advertisements, because it defeats semantics technologies (ineffective on images) and exploits limitations of image recognition technologies (advertisements enclosed in larger images are not detectable). It should be noted that advertisements are not solely involved: an embodiment of the invention addresses every situation wherein one or a plurality of particular areas (such as text or graphics) needs to be secured (need for preserving the integrity of displayed data). This will be further discussed in detail below.

Another benefit of an embodiment of the invention also lies in its ability to avoid any execution of malicious code (if any) for the web browser. It indeed provides an interesting protection against malicious software. The Internet today is infested with dangers, among which is malicious software code. A user visiting a web page with a web browser can inadvertently execute malicious code, endangering the user's local machine (immediately or in a near future). Generic malicious code comprises, for example, viruses, Trojans later downloading and installing keyloggers, spyware, etc. Private and financial data are then at risk, and the hardware device can also be physically damaged, if not remotely used for illegal purposes. Using a two-tier architecture implementing the described method can be used to avoid malicious code execution on the browser side (the web browser does not receive anymore markup pages with unreliable code, but modified markup files). Quite surprisingly, malware and advertising are tied: malicious code is the to be massively injected through online advertising, due to the complex structure of business relationships (injection of malicious content into legitimate advertising delivery streams). An embodiment of the invention secures the display of advertisements and at the same time avoids malicious code execution. The web browser has the guarantee not to execute any malicious code while the content provider has the guarantee to secure its advertisements. It is a win-win operation that opens many interesting business opportunities. To conclude, parts of the markup file comprising potential malicious code can be removed (an unsafe markup file can be translated into a safer markup file), using the disclosed techniques.

Embodiments of the invention also enable to preserve the user interactivity encoded in the original markup file. By using an adapted scripting language code, the user interactivity can indeed be maintained possible for some areas and can be forbidden (not existing) for other specific areas. This variation is very valuable because of the control it offers over the user interactivity. The interactivity can be left unchanged (the user will still be able to copy and paste contents for example), partly changed or completely removed. This provides much flexibility.

Another advantage (if using a two-tier architecture) is that it only requires a standard browser. It does not require any additional plug-in, components or local software on the client side. No additional software is required on top of the web browser. The present disclosure is thus the first approach that works without browser modifications (use of unmodified browsers). It can be used directly in today's browsers, hence adoption can be immediate.

Yet another advantage is that it enables a fast and low cost internet access. It reduces the weight and complexity of an incoming markup file for the web browser (it reduces possible bugs or error contained in code elements). Today, a lot of devices (mobile phones, tablet PCs, etc.) have limited CPU capacities. Because modified markup files mostly contain image files (in addition to scripting language code which is not malicious), browser or viewers running on the devices almost only need to be able to display images. It thus enables remote browsing for mobile devices with limited computing and memory resources.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings.

FIG. 4, comprising

FIG. 5, comprising FIGS. 5a and 5b, shows an example of a second modification brought to the DOM tree.

DETAILED DESCRIPTION OF THE INVENTION

To facilitate description, any numeral identifying an element in one figure will represent the same element in any other figure.

The following text presents a detailed embodiment in the context of adblocking but it is to be understood that it is not limited to this specific domain and that it extends equally to domains such as computer security (malicious code removal, anti-crawling tool, etc.), internet accessibility, content personalization and edition, data conversion, Software as a Service delivery, Digital Rights Management, Trusted Computing, etc.

As a definition, a document object model (DOM) expression is to be understood as a way to refer to a (or the) logical structure of a document. THE expression can thus be replaced by expressions such as "logical structure" or "hierarchical structure" or "structure". The "DOM tree" can be read "tree of the logical structure" for example. For the sake of conciseness and clarity, expressions such as "DOM" and "DOM tree" are used.

Figure 1:
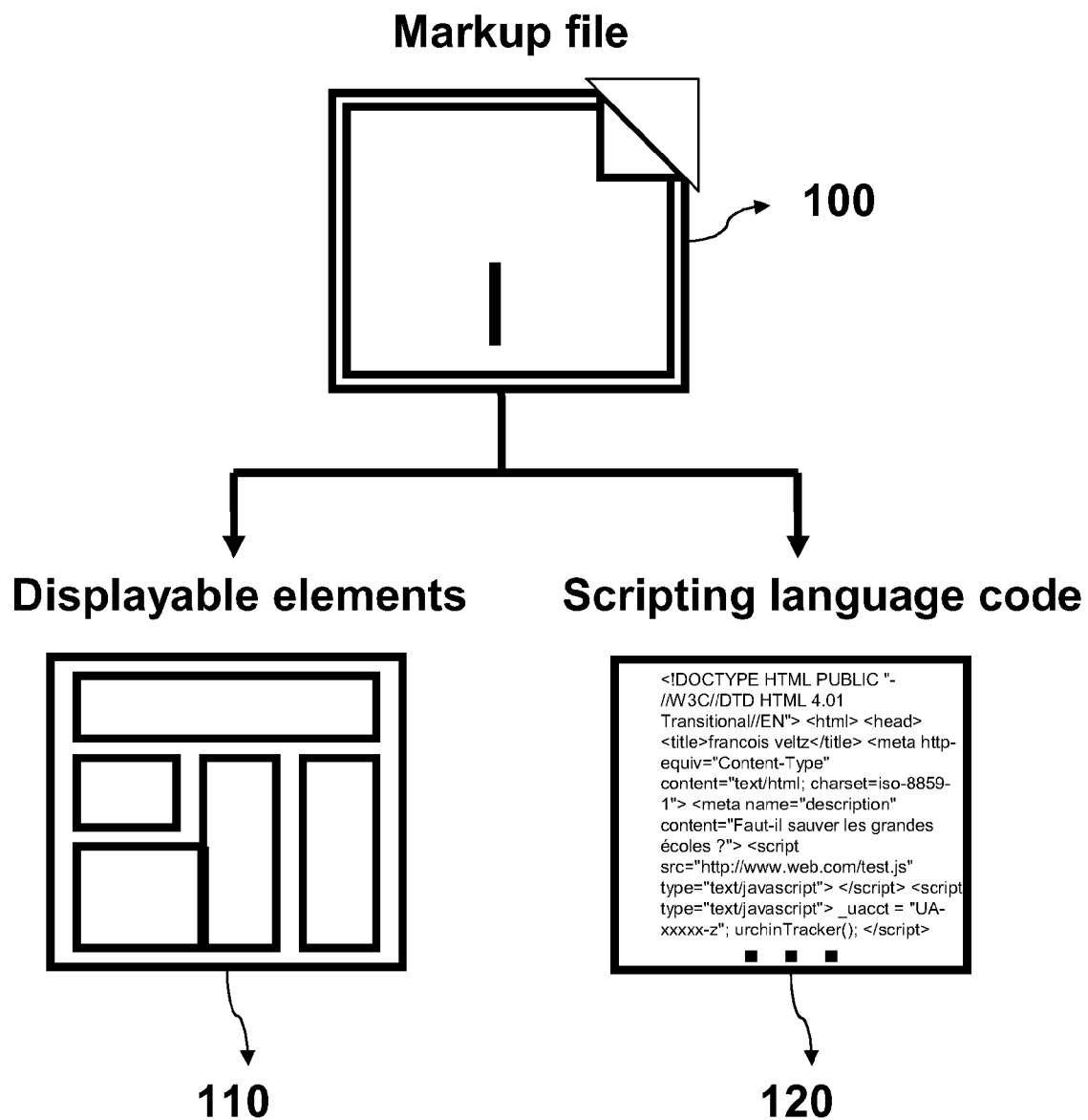
FIG. 1 shows the displayable elements and the scripting language code of a markup file.

FIG. 1 shows the displayable elements and the scripting language code of a markup file.

Reference is now made to FIG. 1, which shows the object that will be modified and used according to the present disclosure. A markup file (100) comprises a set of displayable elements (110) and a scripting language code (120). The markup file (100) is usually a binary file but it can exist in a formatted nature. It is usually transmitted over networks and/or retrieved locally in memory. The markup file (100) may be generated locally, entirely or in parts. In an embodiment, the markup file (100) is an HTML or PHP or XML file. Web pages indeed include (displayable) content, and instructions or embedded information (such as meta information, hyperlinks addresses, Javascript).

According to embodiments, the determination of displayable elements (110) can be considered relative or absolute. The determination is the to be relative when resulting from the interpretation by a viewer. For example, a set of displayable elements of an HTML markup file will be determined by loading and interpreting the markup file in a web browser (or web browser instance). It is observed that different web browsers may lead to different interpretation (and thus different sets of displayable elements), although there is a convergence between the different interpretations performed by web browsers existing on the market. In this sense, the interpretation is considered relative. Another approach would integrate the different behaviors of web browsers into a common rendering model (absolute interpretation). In brief, these displayable elements are all elements that will reach the user's eyes or that are useful to this final display. Displayable elements (110) thus can be elements, such as images, videos areas, and text areas. The "displayable elements" expression is intended to cover elements that will be seen by the user in the end. Consequently, it covers cases including possible further operations (such as filtering or masking) that may happen after the operations performed by the described method.

According to an embodiment, regarding the scripting language code (120), it is observed that the expression "scripting language code" designates all instructions or lines of software code comprised in the markup file (100). In detail, it comprises all suites of characters forming instructions understandable by the machine by/for interpreting the markup file. In other words, it comprises all data that is not intended to be directly seen by the final user or viewer of the markup file (such as scripts or meta data for example). In addition, it also comprises all data that IS indirectly useful for the display of displayable elements (for example <DIV> HTML tags). The scripting language code (120) is often enclosed in the markup file (or can be associated with it and further retrieved). Code elements are usually enclosed in the markup file, but not always. Indeed, modern programming techniques (such as Ajax) may use the dynamic retrieval of code programs. Consequently, in some situations, it may be necessary to retrieve pieces of code elements, dynamically associated with the set of code elements originally enclosed in the markup file. For example, a user action in the browser may imply a further modification of the markup file (by retrieving new instructions from a server, or by accessing local resources; for example through "Xinclude" which defines the ability for XML files to include all or part of an external file). For this reason it is necessary to first interpret the markup file. Parsing the markup file also can be used to obtain the DOM tree, which will be manipulated and modified according to embodiments of the invention. This last point is discussed in the next section.

Figure 2:
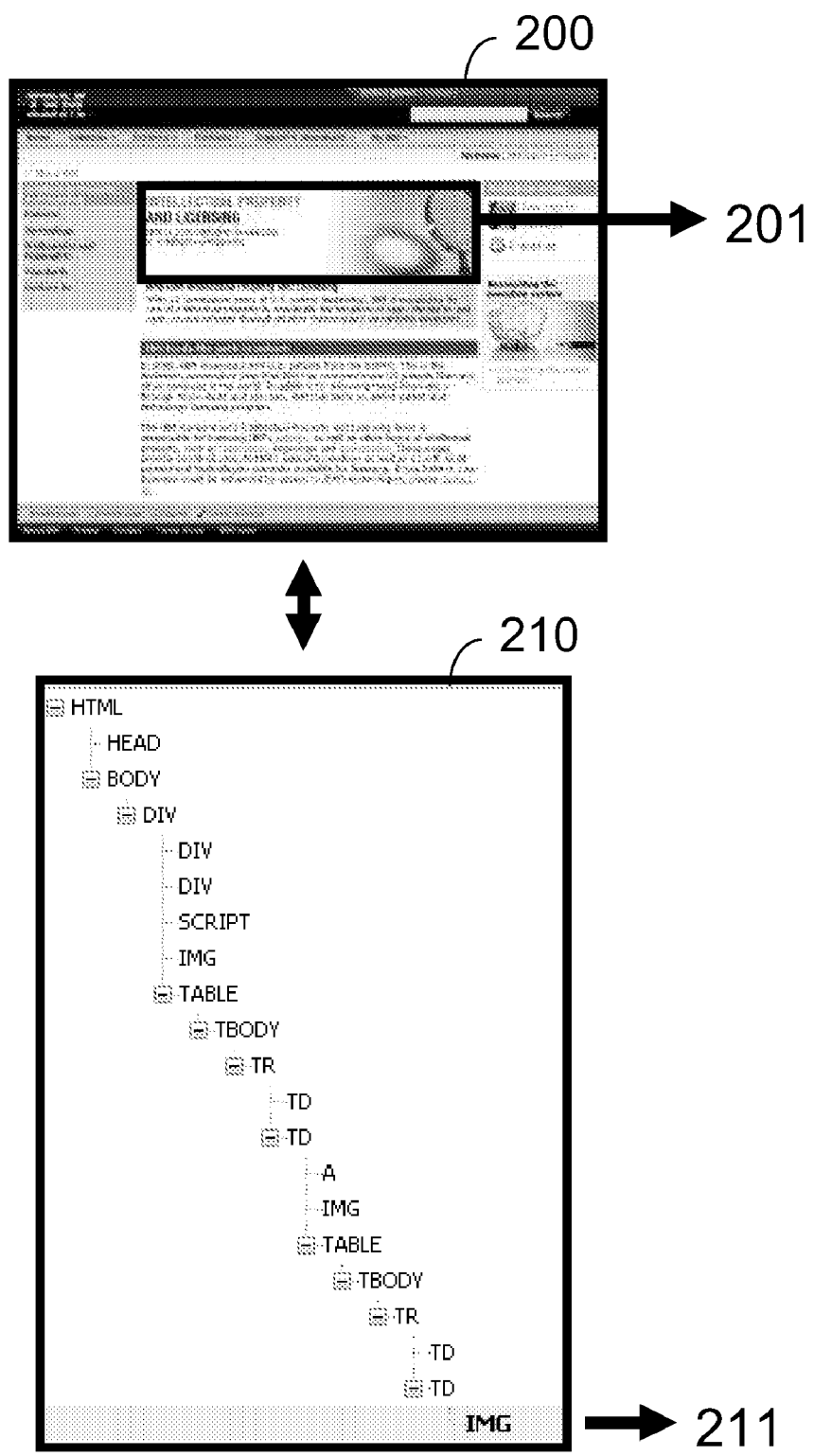
FIG. 2 shows a markup file and its associated DOM tree.

Reference is now made to FIG. 2, which shows an interpreted markup file (200), a displayable element (201), a DOM tree (210) and a particular node (211) of the DOM tree.

The so-called DOM (Document Object Model) is a way to refer to elements (such as XML or HTML) as objects. It is a platform-independent and language-independent standard object model for representing HTML or XML and related formats. In particular, the Document Object Model is the way JavaScript sees the containing HTML page. The DOM defines the logical structure of documents and the way a document is accessed and manipulated. The logical structure of the document is thus defined thanks to the so-called DOM tree. The parts of the DOM tree are known as nodes. In other words, the DOM presents a document as a tree-structure (a node tree), with the elements, attributes, and text defined as nodes. The DOM tree can be then seen as a collection of nodes, with each node corresponding to a subset of the language scripting file of the markup file (a node can then comprise or correspond to a script/program, a fragment of script/program, or any another object including a displayable element like an image). A node tree shows an XML document as a set of nodes and the connections between the nodes. According to the DOM, everything in an XML document is a node. The entire document is a document node. Every XML element is an element node. The text in the XML elements are text nodes. Every attribute is an attribute node. Comments are comment nodes.

To get the DOM tree of a markup file, a markup file parser can be used. Indeed, a parser loads the document into the computer's memory. Once the document is loaded, data of the document can be manipulated using the DOM, which treats the XML document as a tree. There may be some differences between the XML parsers used in different browsers, but the described method and system apply to all browsers and parsers.

The markup file (200) comprises a displayable element (201). The DOM tree (210) is the DOM tree of the markup file (200). The DOM tree (210) comprises a set of nodes. The particular node (211) of the DOM tree (210) corresponds to the displayable element (201) of the markup file (200).

In FIG. 2, the markup file (200) is illustrated as a web page. The displayable element (201) is illustrated as an advertisement image. As further illustrated in FIG. 2, the DOM tree (210) comprises a plurality of (parent and child) nodes. The particular node (211) contains an <IMG> tag. The image to which it is referred is the advertisement image.

It is underlined that FIG. 2 only provides an example. DOM trees and related markup files can be much more complex. Displayable elements corresponding to nodes can be elements such as still images, animated images, Flash or Shockwave objects, videos objects, text areas, etc.

Figure 3A:
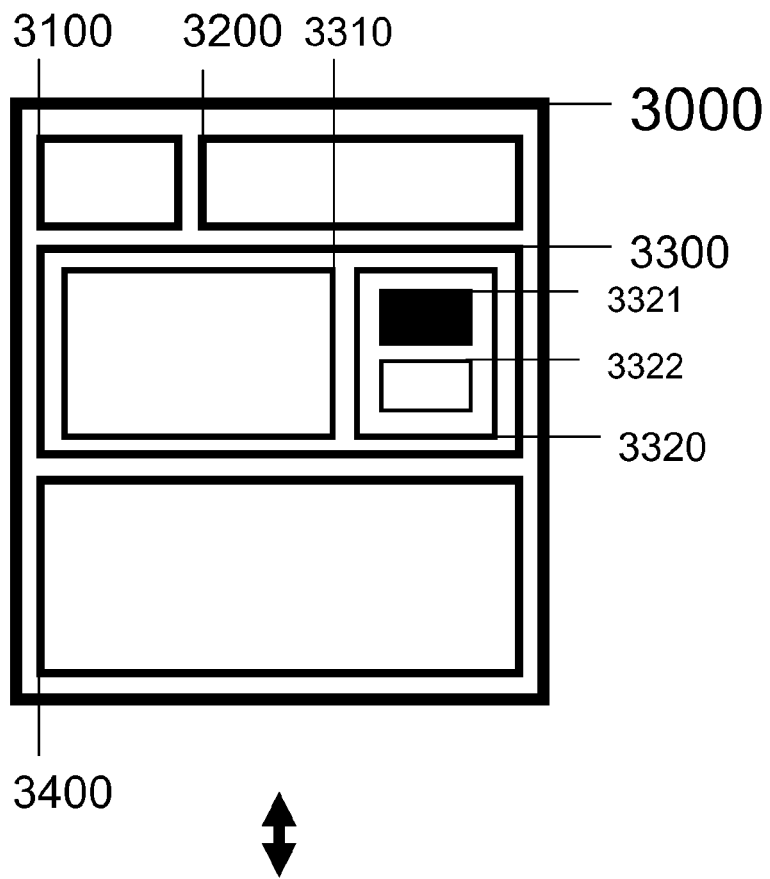
FIG. 3, comprising FIGS. 3a and 3b, provides a representation of a DOM tree and its associated nodes.
Figure 3B:
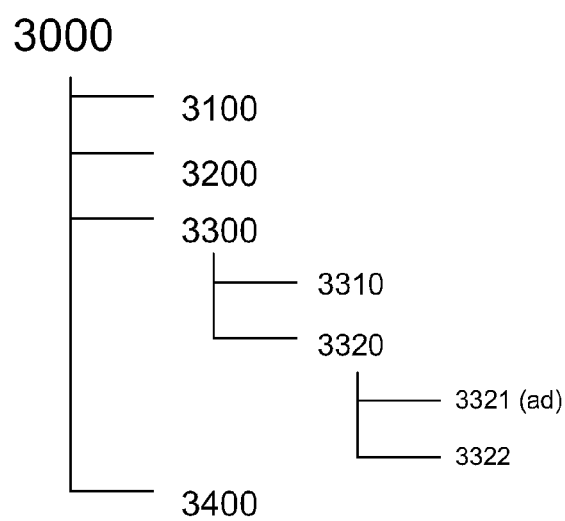

Reference is now made to FIGS. 3a and 3b. FIG. 3a is a representation of an example of a markup file comprising a plurality of displayable elements, which correspond to DOM tree nodes. FIG. 3b is a representation of the DOM tree corresponding to the considered markup file (following the example developed in previous FIG. 2).

In a DOM tree, the top node is called the root. Every node, except the root, has exactly one parent node. A node can have any number of children. A leaf is a node with no children. Siblings are nodes with the same parent. Each node has a name, a value and a type (element, attribute, text, comment, document). From a given node, it is possible to get other related nodes (childNodes, parentNode, firstChild, lastChild, nextSibling, previousSibling, etc.).

In the example developed in both FIGS. 3a and 3b, the node (3000) is the root node. The nodes (3100, 3200, 3300, 3400) are child nodes of the root node (3000). The nodes (3310, 3320) are child nodes of node (3300). The nodes (3321, 3322) are child nodes of node (3320). The nodes (3100, 3200, 3300, 3400) are siblings nodes. The nodes (3310, 3320) are siblings nodes. The nodes (3321, 3322) are siblings nodes.

The particular node (3321) comprises an advertisement image. It is noted that the FIGS. 3a and 3b only provide an example. There can be a plurality of areas whose display is to be secured. These areas can be located anywhere in the interpreted markup file.

Figure 4A:
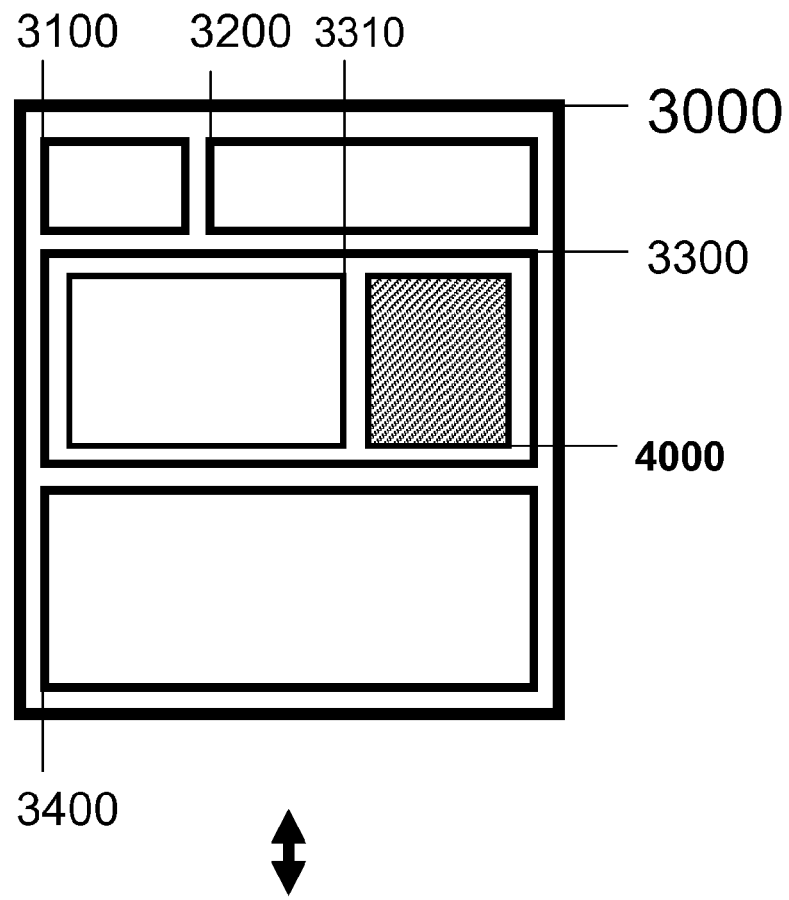
FIGS. 4a and 4b, shows an example of a first modification brought to the DOM tree.
Figure 4B:
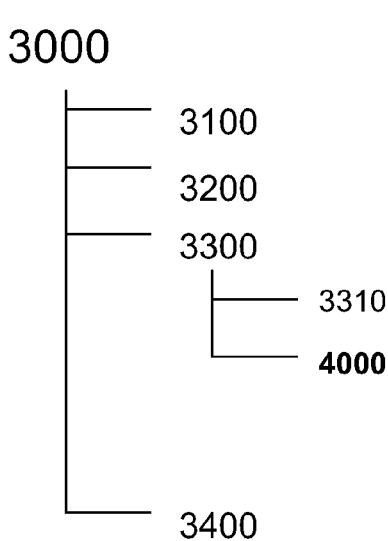

Reference is now made to FIGS. 4a and 4b, which show elements of the previous FIGS. 3a and 3b with modifications brought by application of the disclosed method and system.

Parsers (see explanations of FIG. 1) support all the necessary functions to traverse the node tree, access the nodes and their attribute values, insert and delete nodes, and convert the node tree back to XML. It is possible to get, set, remove, replace, create, add, and clone nodes. DOM allows for arbitrary modifications. Programmers can build documents, navigate their structure, and add, modify, or delete elements and content. Embodiments of the invention use such mechanisms in order to secure the display of particular regions of interest in the interpreted or executed markup file.

According to the invention, there is disclosed a method of modifying a DOM tree of an interpreted markup file comprising one or more displayable elements. The method comprises: defining a particular displayed area of the interpreted markup file; obtaining the DOM tree of the interpreted markup file, the DOM tree comprising at least one parent node and a plurality of child nodes; each node being associated with at least one of the displayable elements; identifying in the DOM tree a set of the child nodes whose displayable elements comprise at least a part of the particular displayed area; identifying in the DOM tree a first parent node comprising the set of child nodes; converting all displayable elements associated with the identified first parent node to a master image; generating a second parent node comprising the master image; modifying the DOM tree into a modified DOM tree by deleting the identified set of child nodes and by replacing the identified first parent node by the second parent node.

Manipulation of the DOM tree or nodes is intended to cover actions or commands such as get, retrieve, insert, replace, delete, append, remove, normalize, create, clone, read, enable, disable, click, select, clear, populate, propagate, swap, etc. Manipulating nodes can be tricky because it may build invalid tree structures (optional validation tool or step) but speed and efficiency are gained by working directly with the document tree.

In the example developed in FIGS. 3a and 3b, a particular displayed area of the interpreted markup file is defined, namely, the node (3321) which contains the advertisement image (<IMG> node). A set of child nodes whose displayable elements comprise the particular displayed area is identified in the DOM tree. In this case, the set of child nodes (3320, 3300) contains the advertisement image. A first parent node comprising at least one node of the set of child nodes is identified in the DOM tree (node 3320 (note that node 3320 is the parent node of nodes 3321 and 3322, while node 3320 is a child node of node 3300)). Displayable elements associated with the first identified parent node (3320) are converted to a (master) image. A second parent node (4000) comprising the (master) image is generated. The DOM tree is then accordingly modified, wherein child nodes (3321, 3322 and 3320) are deleted and replaced by the generated second parent node (4000).

Methods such as "replaceChild( )" (and/or the "nodeValue" property and/or "replaceData( )" and/or "setAttribute( )" etc.) can be used to retrieve, replace or append data in a node (or to modify an entire node). Such methods come up with many parameters enabling much flexibility, enabling to replace a first <X> element with a new <Y> element.

The generated image captures what is displayed to the user. This can be achieved using several techniques, for example by accessing the video buffer (most of the time, the operating system itself does provide such a feature) or by functions provided by the browser/parser or even by Java APIs (for example, the class JEditorPane and the Swing HTML Package extension).

The DOM Image Object represents an embedded image. For each instance of an <IMG> tag in an HTML document, an image object is created. The image object properties are: align (sets or returns how to align an image according to the surrounding text), alt (sets or returns an alternate text to be displayed, if a browser cannot show an image), border (sets or returns the border around an image), complete (returns whether or not the browser has finished loading the image), height (sets or returns the height of an image), hspace (sets or returns the white space on the left and right side of the image), id (sets or returns the id of the image), isMap (returns whether or not an image is a server-side image map), long Desc (sets or returns a URL to a document containing a description of the image), lowsrc (sets or returns a URL to a low-resolution version of an image), name (sets or returns the name of an image), src (sets or returns the URL of an image), usemap (sets or returns the value of the usemap attribute of an client-side image map), vspace (sets or returns the white space on the top and bottom of the image), and width (sets or returns the width of an image).

As illustrated in FIG. 4b, the modified DOM tree now contains siblings nodes (3100, 3200, 3300, 3400) in addition to child node (3310) of node (3300) and new child node (4000) of node (3300). Further image processing steps will be later discussed.

Reference is now made to FIGS. 5a and 5b, which show further modifications brought by application of the disclosed method. This time, a new node (5000) is generated. FIG. 5a shows that the node (5000) contains a (master) image which has captured the contents of node (3300), i.e., contents of nodes (4000) and (3310) of the previous FIGS. 4a and 4b. FIG. 5b shows the corresponding rewriting of the DOM tree.

In the proposed example, the surface of the (master) image corresponding to the node (3300) on FIG. 5a is much superior to the surface of the precedent image corresponding to the node (3320) of FIG. 4a. Effects of such an extension are now discussed. First, the comprehensive data of the advertisement image corresponding to the node (3321) is drawn in the much larger surface of FIG. 5b and, as such, image matching techniques will likely fail (see explanations in the next section). Second, possible malicious code in node (3300) is removed and replaced by a harmless still image. Third, the user interactivity encoded in the considered node is removed (the section related to FIG. 8 will describe how and why to preserve the interactivity).

It is observed that the general hierarchical structure of the DOM tree implies constraints in terms of "image freezing" of markup files, wherein the "freezing" can only propagate vertically and/or horizontally. The structure (in Russian dolls) can be very complex and can involve a high number of nodes. In the proposed example, nodes (3300) and (3400) could be gathered into a larger image, or the three nodes (3100), (3200) and (3300) into one single image, or even the entire root node (3000) into one single image again.

Figure 6:
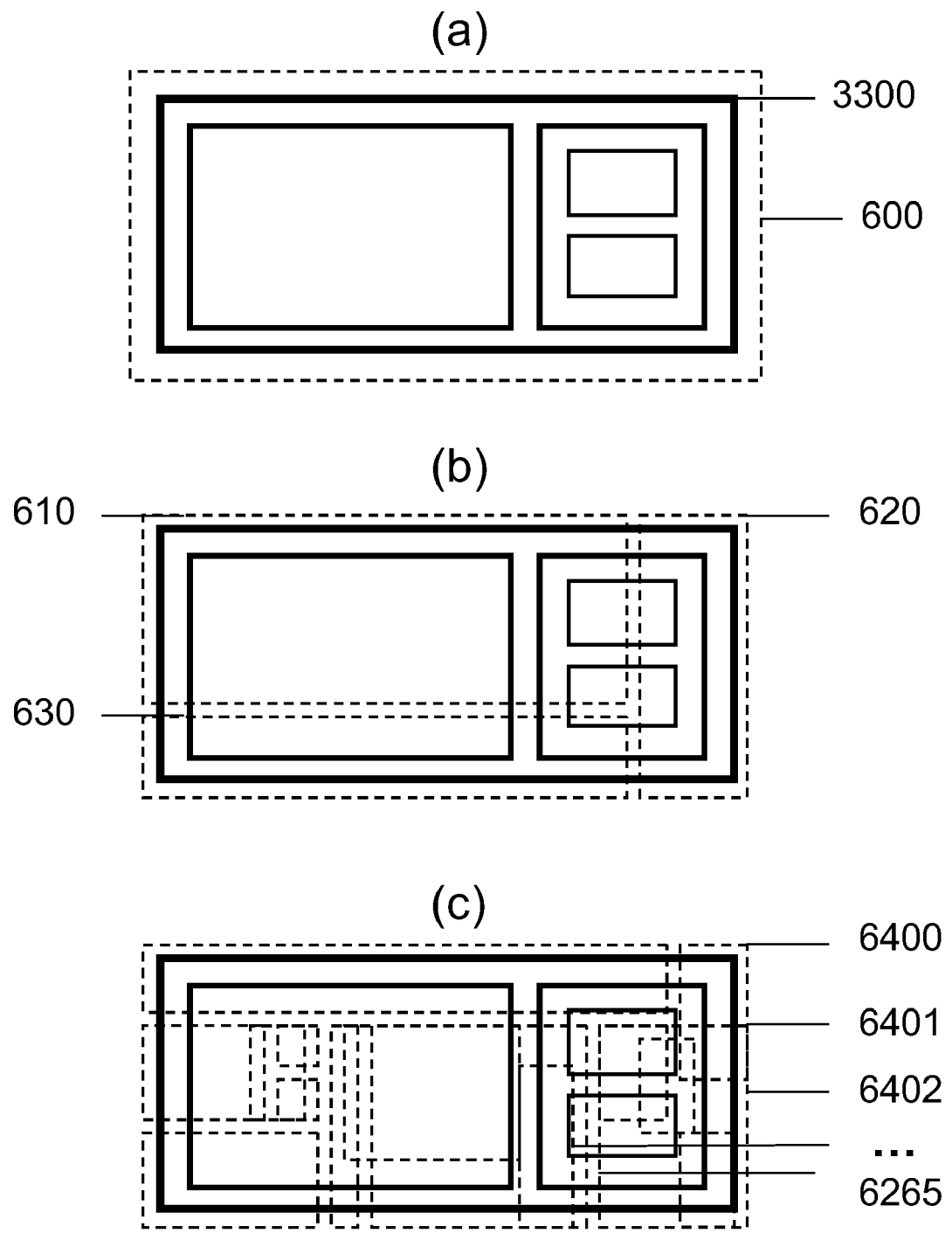
FIG. 6 illustrates various sub-images generation modes.

Reference is now made to FIG. 6, which illustrates various optional image generation modes. FIGS. 6a, 6b and 6c show a node (3300) and images (600, 610, 620, 630, 6400, 6401, 6402, . . . 6265).

FIG. 6a illustrates the case wherein a single image (600) is generated (represented in dotted line), according to an embodiment. The single (master) image (600) represents the totality of the displayable elements of the node (3300) including its child nodes; it may be considered as a "background" image, related to the considered node.

FIG. 6b, according to other embodiments, illustrates the case wherein the displayable elements are converted into a plurality of sub-images (610, 620, 630). In other words, the image (600) can be further divided into a plurality of sub-images ("image mapping" obtained from the original). It is underlined that it may be valuable to get a disposition of sub-images which does not correspond to (or duplicates) the original arrangement of displayable elements. In other words, the present mode of image generation may benefit from not duplicating the underlying DOM tree structure (by having non-concordant image mapping with the apparent display structure of the displayable elements of the markup file). This reinforces the robustness of the proposed method and system against adblocking (or filtering) techniques. As it can be seen in FIG. 6b, sub-images (610, 620, 630) do not correspond to the underlying structure of the DOM tree.

FIG. 6c illustrates a further embodiment wherein the displayable elements are converted into a very high number of sub-images (6400, 6401, 6402, . . . 6265), eventually involving random (ever-changing and complex mapping), and be they adjacent or superposing images. Overlap between sub-images indeed remains possible and even wishful.

According to embodiments, the image (600) or any of the generated sub-image (610, 620, 630, 6400, 6401, 6402, . . . 6265) can be further modified or altered by operations such as convolution operations, morphological operations, geometric operations, histogram operations, alpha compositing operations, etc. It is an advantage of an embodiment of the invention to defeat text analysis tools (semantics, OCR, etc.) as well as image recognition tools (pattern matching, edge points, etc.). For example, each generated image or sub-image can be cropped, blurred, encoded in a rare format, transformed into a black and white image, distorted, etc. Noise can also be added to the image or sub-image. It is noted that described operations (such as resizing, divisioning, splitting, partitioning, gathering, grouping, distorting, noising, discretizing, resampling, scrambling, greyscaling, etc.) on the image or sub-images derived from the displayable elements of the markup file can be combined in many ways, the operations aiming at enforcing the robustness of the proposed mechanism against possible adblocking techniques. In particular, according to embodiments, the above operations can be applied to the totality of displayable elements or only selectively to a subset of these displayable elements. However, a compromise has to be found between readability for the final user and greater difficulty to analyze and block the resulting image and/or sub-images. Readability scoring systems can help to perform these operations.

In FIG. 6a, displayable elements of the node (3300) are rendered into an image (600), illustrated in dotted line. According to a particular optional embodiment of the invention, FIGS. 6b and 6c illustrate various sub-images generation modes. Indeed, displayable elements of a markup file can be converted into one (FIG. 6a) or a plurality of images, i.e., sub-images (FIG. 6b and FIG. 6c) in many ways. It is noted that, in an embodiment, generating a single image (600; FIG. 6a) is sufficient to secure the display of advertisements while being fast and easy to achieve. According to other embodiments, a plurality of images (sub-images) may be generated. This is not mandatory, it only reinforces the robustness of the method and system. Such optional divisions may indeed reveal valuable to defeat text or image recognition systems. For this purpose, one or a plurality of sub-images can be also altered by operations such as distorting, greyscaling, re-encoding, resizing, noising, discretizing, resampling or scrambling for example. Image alterations can be driven randomly or by rule decisions or decision logic (hardware or software implemented). Decision logic to perform such alterations would benefit from establishing databases of client browsers' profiles, from testing set of adblockers available on the market, from getting statistics about bandwidth and serving constraints, etc. Rating mechanisms (success of ads deliveries, statistics, etc.) can also be implemented (real-time or not). The reformatting of web pages would be rather variable than constant: each page could be reengineered before serving.

Certain advantages of such a generation of images are now discussed. The outstanding advantage of such an image generation process is that it allows the display of advertisements enclosed in markup files to be secured. Indeed, it defeats all techniques used by so-called adblockers, among which text analysis techniques and image recognition techniques. Because displayable elements containing text have been rendered into an image, no semantic or text filtering tools will be later able to perform any analysis. The comprehensible data for these tools has been simply erased. Still, one might try to perform an OCR analysis (analyzing the image to extract enclosed text), but these tools are very sensitive the quality of the image and do consume a lot of computing resource. An adapted image modification will easily defeat this possibility (by adding noise or by distorting slightly the image, seeking for a compromise between readability for the user and added complexity for OCR or other analysis tools). As per image recognition technologies, they are at very early stage. One might try to isolate image areas from texts areas, and then apply image matching techniques (i.e., comparing isolated images with databases of known advertisement images, to decide whether the isolated images are advertisement images or not). It appears that it is difficult, if not impossible, to detect an advertisement image enclosed in another larger image. The more the surface of the advertisement image is small compared to the total surface, the more image recognition (or matching) performs badly. An advertisement enclosed in a 110% image would be more easily detected and recognized than an ad enclosed in a 400% image (recognition dramatically falls at the threshold 25% in average). Even advanced image recognition technologies, like the so called pattern matching technique (aiming at automatically isolating objects of interest within an image by using edge point detection and other techniques) also fail in practice. Like the use of text analysis techniques, these image recognition technologies are too CPU and memory intensive and thus fail to provide a good solution in real-time or intensive environments. The same analysis can be conducted to product placement in movies (detecting and deleting a brand apparition in a movie will remain impossible for many years)

In FIGS. 6a and 6b, the advantage stems from the difficulty to isolate homogeneous areas and consequently to perform efficient image recognition techniques. In FIG. 6c, the advantage comes up from the difficulty of gathering adequately images to perform image recognition techniques and text/Optical Character Recognition analysis.

Rendering displayable elements into one or a plurality of images thus introduces many advantages. Depending on an adequate intelligent mapping, the robustness of the system to adblocking techniques can be optimized and the display of advertisement can be greatly secured. Given one or a plurality of areas to be secured, one or another image generation mode will be chosen. In other words, knowing the area where the advertisement is placed (according to data provided by the advertiser for example), it is then possible to optimize the image mapping so that image recognition techniques present the lowest possible performance. Such a feature allows interesting business models, since advertisers can pay for additional services (precisely for securing the display of their specific advertisements, for example). It also enables the display of image files to be prioritized (transmitting images in a sequence according to a display priority). For example, the generated image file containing the advertisement could be displayed first; such a feature can be useful when considering bandwidth parameters, etc.)

In conclusion, there is provided a further technique of altering one or a plurality of images by distorting, greyscaling, re-encoding, resizing, noising, discretizing, resampling or scrambling.

Figure 7:
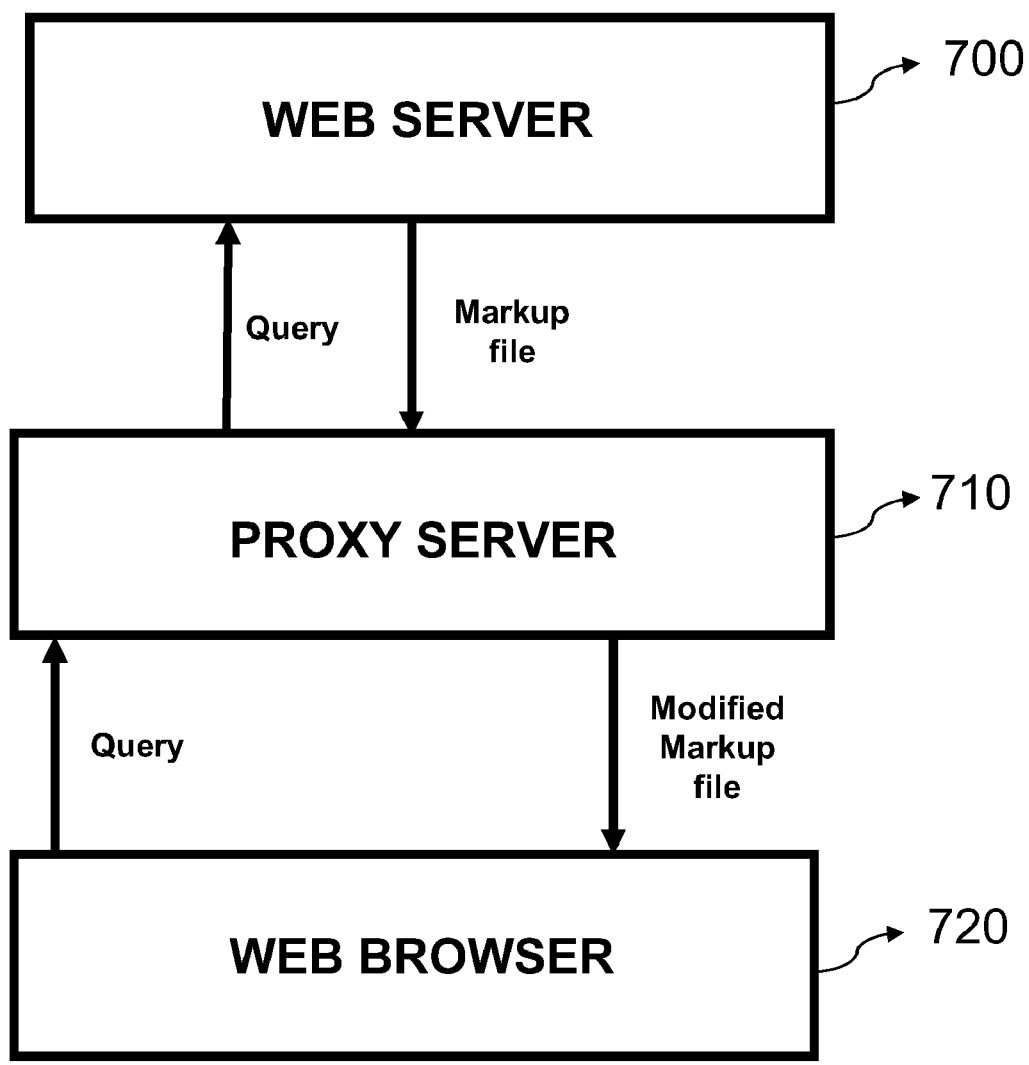
FIG. 7 illustrates an optional two-tier architecture.

Reference is now made to FIG. 7, which shows the principle of an embodiment of the invention. FIG. 7 depicts a web server (700), a proxy server (710) and a web browser (720). A query of the web browser (720) is received (or intercepted) by the proxy server (710). The proxy server (710) transmits through a network (not shown) the query to the web server (700). In response to the query, the web server transmits through a network (not shown) a markup file. The proxy receives the markup file and operates a series of operations with the markup file according to the described embodiments of the invention and finally transmits through a network (not shown) a modified markup file to the browser (720). The web browser (720) interprets the modified markup file.

FIG. 7 is only provided as an example. Many options and alternatives will be further discussed. In particular, there can be one or a plurality of networks involved, which can change over time and can be of different nature (RTC, ADSL, Fiber, T1, Wimax, UMTS, Wifi, etc), using different protocols.

Figure 8:
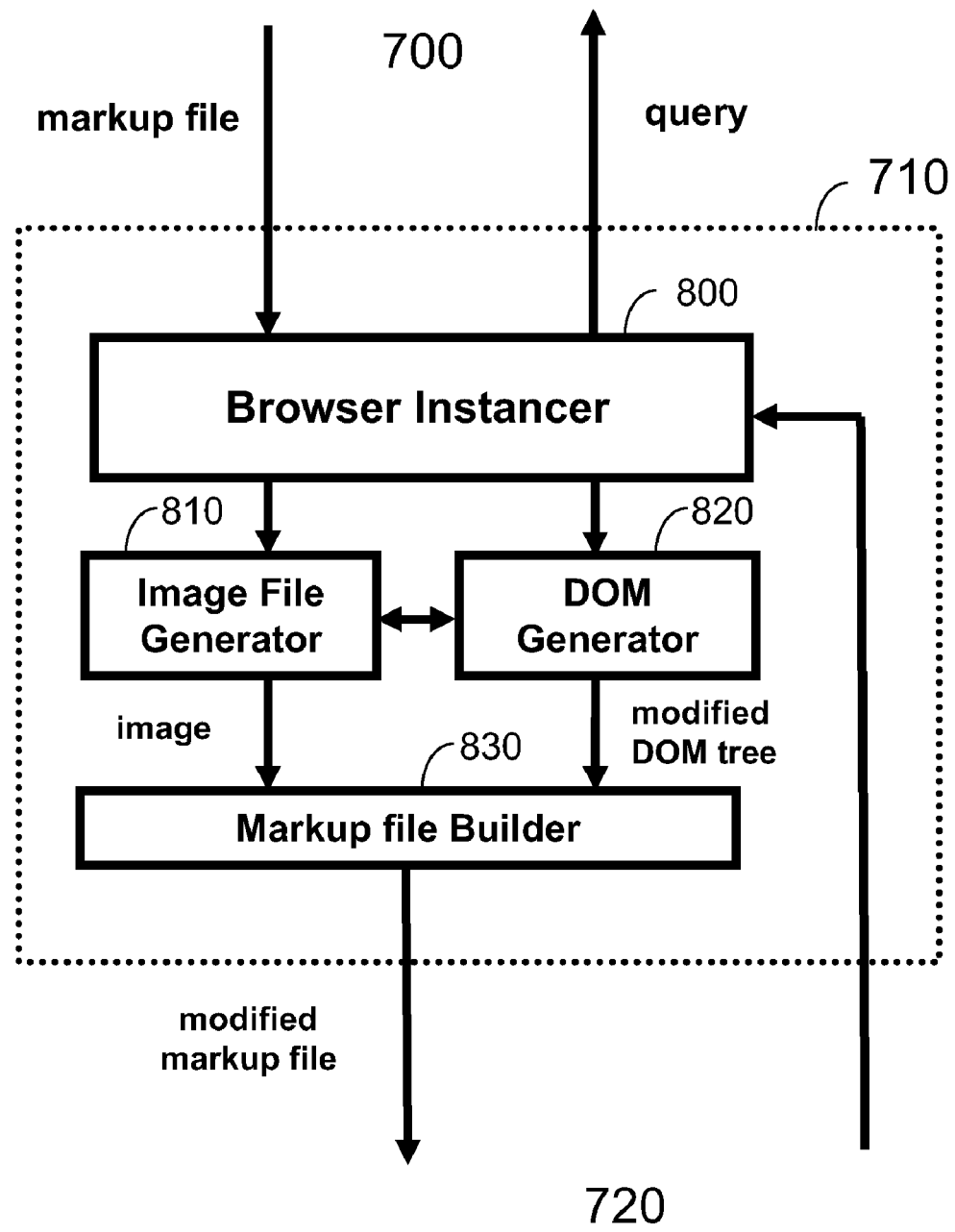
FIG. 8 shows operations on the proxy.

FIG. 8 shows operations on the proxy. According to an embodiment, FIG. 8 shows a Browser Instancer (800), an Image File Generator (810), a DOM Generator (820) and a Markup File Builder (830).

According to embodiments, a markup file served by the web server (700) is received by the Browser Instancer (800). The Browser Instancer (800) interprets the markup file, i.e., the Browser Instancer (800) executes the markup file in a viewer or browser. After parsing, the DOM Generator (820) constructs the DOM tree of the markup file. The DOM Generator (820) is adapted to manipulate and/or modify the DOM tree (e.g., by operations such as deletion of node(s), replacement of node(s), etc). The DOM Generator (820) interacts with the Image File Generator (810), which is suitable for rendering one or a plurality of images (sub-images) from one or a plurality of nodes of the markup file DOM tree. In other words, the Image File Generator interacts with the DOM Generator (820) which outputs modified DOM trees (i.e., scripting language code; HTML, PHP, XML code or data).

According to embodiments, the Markup File Builder (830) then builds a modified markup file from the modified DOM tree of the DOM Generator (820) and the image (or collection of sub-images) being generated by the Image File Generator (810), with an additional scripting language code. The scripting language code is adapted to cause a user terminal upon which it is executed to transmit coordinate information defining the position of a user-controlled cursor. In addition, the scripting language code can be further adapted to cause a user terminal upon which it is executed to transmit action information defining a clicking action of a user-controlled cursor. The scripting language code also encodes the relative positions of images having been generated (if a plurality of sub-images has been rendered).

The modified markup file is then received and interpreted by the web browser (720). In response to the user's pointer actions, the Browser Instancer (800) duplicates the user's action. In other words, the Browser Instancer (800) simulates the user-controlled action (e.g., click) at given coordinates in the corresponding browsing instance or session. Finally, the Browser Instancer (800) queries the web server (700), and the process continues accordingly for interactively browsing the Internet.

According to an embodiment, while the original markup file served by the web server (700) contains a set of displayable elements and corresponds to an original DOM tree, the modified markup file, outputted by the proxy server (710), contains one additional image (or a plurality of additional images), generated by the Image File Generator (810), a new (and light) scripting language code generated by the Markup File Builder (830). The modified markup file also has a new data structure, since it has been reconstructed according to a modified DOM tree.

According to embodiments, regarding the scripting language code generated by the Markup File Builder (830), it is further observed that it can be adapted to cause a user terminal upon which it is executed to transmit the coordinate information continuously (for prefetching purposes, i.e., anticipate the request of markup files referred to in links present in the markup file to accelerate response time) or on a periodic basis (via refresh mechanisms). It may be recalled that relative positions of image files having been generated constitute part of the scripting language code generated by the Markup File Builder (830). According to embodiments, the information related to the cursor coordinates and/or actions (clicks) can be relative to any one of the generated images or defined with absolute coordinates in the modified markup file. According to other embodiments, the scripting language code generated by the Markup File Builder (830) can be further adapted to transmit coordinates and clicks for a only subset of images generated by the Image File Generator (810) or even for a subarea of one single image (sub-image). In other words, the user interactivity can be maintained possible for some areas and can be forbidden (not existing) for other specific areas. This variation is very valuable because of the control it offers over the user interactivity.

As per the generation of images, as further described with regard to FIG. 6, there is disclosed a type of mirroring between the instance running in the web browser and the instance running in the Browser Instancer (800), according to an embodiment. Such a mirroring enables further possibilities. In the case where the markup file is an HTTP markup file, when an HTML request is performed, information about the browser itself is transmitted (e.g., type, colors, resolution, etc.). Usually, this sort of fingerprint is transmitted once, but this information can be retrieved on a regular basis. With (java)script code, it is thus possible to analyze the resolution of the page and to accordingly render the image files (by resizing the image(s)). According to embodiments, the images generated by an embodiment of the invention can be of the same size than those of the displayable elements of the original markup file. However, according to other embodiments, they also can be larger or smaller, depending of the display area of targeted viewer or browser. In the case where image files are larger than the display area of the targeted viewer or browser, the targeted viewer or browser will use standard scrolling options to display the complete image of the original markup file. According to other embodiments, the use of cookies can be valuable to store user-controlled coordinates, store information about the web browser (e.g., type, colors, resolution, etc.), setup auto-refresh mechanisms, etc.

According to embodiments, depending on web browsers, the image rendering of displayable elements of markup files can be slightly different. In principle, HTML is a standard and then the rendering of the final HTML page is consistent among browsers available in the market. However, in practice, there may be differences between the different renderings performed by different web browsers. The disclosed operations can be directed to take into account these differences.

Figure 9:
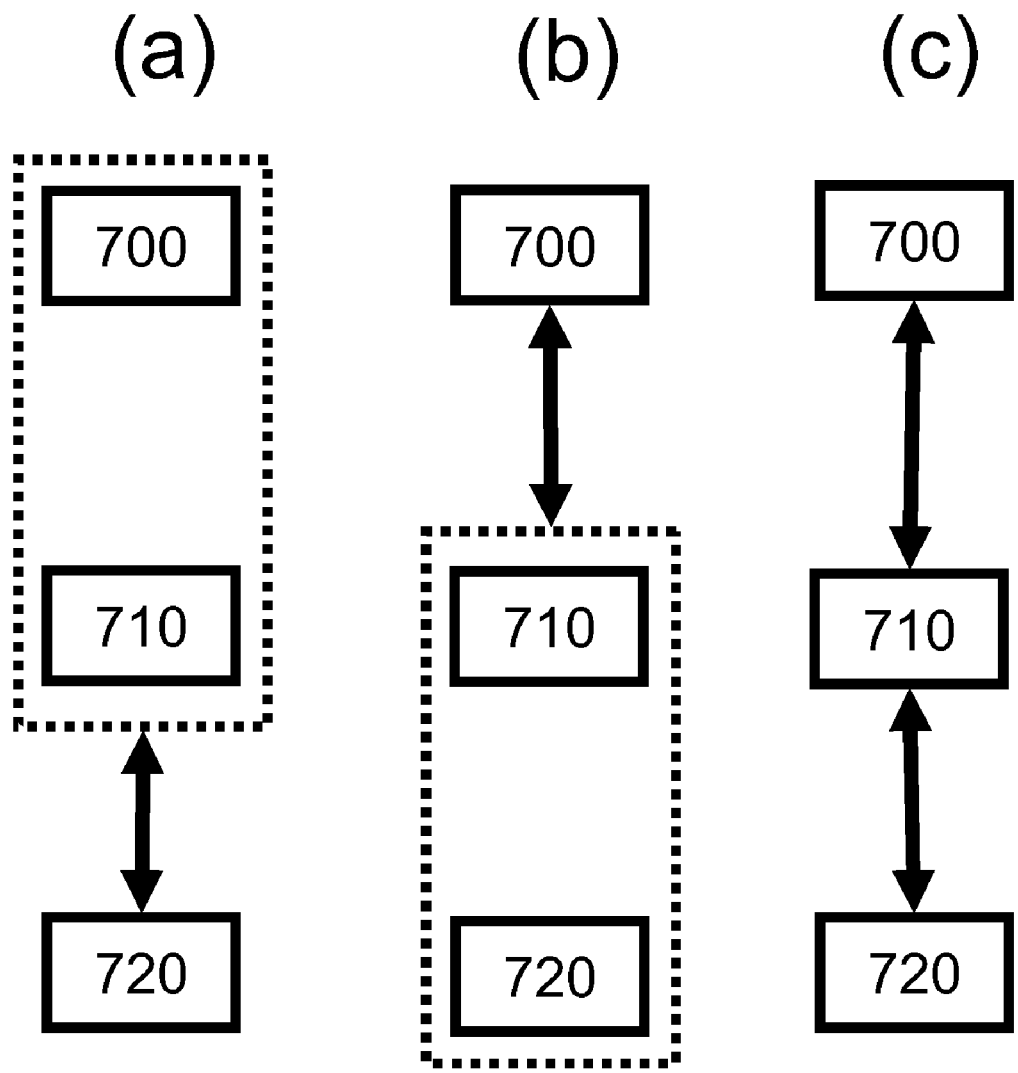
FIG. 9 illustrates architecture options.

Reference is now made to FIG. 9, which considers architecture options and alternatives. The present disclosure shows a two-tier architecture, wherein the proxy server performs steps of particular embodiments of the invention (DOM tree modification and image generation). However, the implementation of the proposed mechanisms can be made according to many more possibilities that will be further discussed.

Introductory considerations about proxy and the economy of browsers are required. Browsers can be broadly understood as "viewers". A browser is designed to render markup files into displayable elements for the user and to execute code elements. Indeed, web browsers are software programs installed on desktop computers or mobile devices and adapted to execute script programs (mostly JavaScript), parse and display web pages. From technical and legal points of view, some web browsers are open source (like Firefox (Firefox is a trademark of the Mozilla Foundation)) and others are proprietary. This distinction between open source and proprietary is important, because proprietary software can be used to control software code developments, which is not the case with open source software. For example, proprietary media players can forbid fast-forward, thus forcing users to watch video advertisements (in general located at the beginning of video files). With open source software (i.e., accessible and modifiable software code), this is not possible anymore, since software code can be changed to enable advertisement skipping. More generally, this is true for any DRM (Digital Management Right) system, which necessarily requires at least a portion of closed software code (protection by secret as opposed to open source code which is available to anyone). In theory, proprietary browsers would be capable of selectively enabling advertisement blocking (no specific add-on available, etc). The case of open source web browsers is more simple, since forks can emerge anytime, allowing such specific add-ons. Another important aspect of advertising blocking economy is business interests. A well known open source browser is largely funded by a major advertising company (and thus has little incentive and interest in enabling a default integration of ad blockers in its browser). However, forks (modified distributions of the open source browser) could emerge anytime. Proprietary web browsers could possibly selectively enable some advertisements and disable others, according to their own interests or agreements. For example, it might be technically possible for Microsoft Internet Explorer (Internet Explorer is a trademark of Microsoft Corp.) to block Google Adwords™ (Google and Adwords are trademarks of Google Inc.) and to allow only those of its own platform. For all these reasons, the use of a proxy server performing steps of an embodiment of the invention is very valuable (but not mandatory).

FIG. 9 shows a web server (700), a proxy server (710) and a web browser (720), in various configurations. Logically, the proxy server (710) is located between the web server (700) and the web browser. Physically, the proxy server (710) and the web browser (700) can be running on the same physical machine as shown for example on FIG. 9*a*. However, using a virtual machine on the local machine running the web browser (720) itself is not always possible and FIG. 9*b* shows a situation wherein the proxy server (710) and the web server (700) run on the same physical machine. FIG. 9*c* shows the last situation wherein the web server (700), the proxy server (710) and the web browser (720) run on three different physical machines.

Since a proxy is usually hardware-implemented, it can also be software-implemented. Consequently, steps of an embodiment of the invention can be implemented partly in the web browser (720), partly in the proxy server (710), partly in the web server (700) (or a combination).

According to embodiments, since the proxy server will see all queries of the web server (e.g., account numbers, passwords and visited pages of the web browser will be transmitted to the proxy server through the web browser queries), it is highly recommended that the proxy be run by a trusted party (unless suitable anonymization mechanisms are used). Authentication mechanisms may be used (ranging from a strong authentication to a simple registration ; hash values may be used for the delivery of image files).

FIG. 9*a* is anticipated to be a simple and easy implementation, because of agreements between administrators of the web server (content provider) and advertisers. In an embodiment, the web browser has nothing to tell about this mode of implementation (operations performed will be transparent, i.e., the browser will only receive modified markup files, while queries will be easily intercepted by the proxy server). The advantage of such configuration is that the web browser has the guarantee not to execute any malicious code while the content provider has the guarantee to secure its advertisements. It is a win-win operation that opens many interesting business opportunities.

FIG. 9*b* illustrates a further possibility, according to an embodiment. The program implementing an embodiment of the invention can be executing in a superior level than the web browser (operating system for example). Or it can be implemented in the form of a plug-in or add-on. The execution or presence of such a program may even be required by the web server for example (non compliant browsers wouldn't be served for example). The browser may agree to the presence of described steps, or not. For example, the presence and execution of such a program (trough a marketed "ad secure" browser add-on) may be required by the advertiser in order to allow the delivery of web pages (in this case, the user of the browser may agree to the installation of such an add-on for example). According to embodiments, it may also be implemented in a form of malware, which will execute the steps without the consent of the user of the browser. According to other embodiments, it may also correspond to the implementation of an embodiment of the invention in a proprietary browser (over which the user has little if no control).

FIG. 9*c* illustrates more complex cases, since the proxy server may act as a malware for example (man-in-the middle attack, for securing the display of advertisements, eventually against the willingness of the browser, or without its consent). According to embodiments, this also illustrates a possible mutualisation of proxy servers through the network, or the proxy acting as an on-demand resource for the web server and offering reliable access to Internet for the web browser.

Further observations can be formulated about the proposed two-tier architecture. The modified markup file can (in some situations) exclusively contain addresses of content servers (URLs of external web servers, i.e., which do not implement the described method) and in this case, the web browser will query directly these content servers when interpreting the modified markup file (HTTP GET requests for example). This is an open system. For example, a scenario of such a use of the described method corresponds to a one-shot way, "on-demand", to secure the display of a web page. However, the modified markup file also can exclusively comprise addresses of proxies implementing the described method and in this case, the proxies would be further adapted with address-translators for retrieving requested contents. This is a closed system, forcing the web browser to query only proxies implementing the described system. Once a web browser has queried such a proxy, it is trapped and will only see reengineered contents (by the present method or others). A last possibility is to have the modified markup file containing both addresses of content servers (for direct queries) and proxies (for indirect queries). These three possibilities depend on a policy to be determined (policy to decide whether the described system is closed or opened, or at what point it is partially opened or closed).

Embodiments of the invention can be seen as being a synergy between technologies not related at first sight: a technique of generation of images and a DOM tree modification mechanism. In other words, an embodiment of the invention combines a DOM tree modification mechanism in addition to an image generation processing mechanism.

According to an embodiment, there is provided a system to secure the display of advertisements (selectively, in addition). The system involves a web server, a proxy server and a client browser. In response to a first client browser query, the proxy server requests the corresponding markup file from the web server; upon reception of the markup file, the proxy server interprets the markup file in browser, gets the DOM tree and transforms a part of the interpreted (executed) markup file into a graphical image. The proxy server then constructs a modified markup file containing the graphical image from a modified DOM tree (and optional light reengineered scripting language code, adapted to transmit coordinate information defining the position of a user-controlled cursor and action information (such as a click) of the user-controlled cursor). In the end, the client web browser displays and interprets the modified markup file.

According to particular embodiments of the invention, interpreting (or rendering) a markup file in a viewer or a browser defines (or renders) the displayable elements of the markup file. An interpreted markup file can be entirely or partly "frozen" into an image. In other words, it is possible to replace some areas or subparts of an interpreted markup file by its associated image(s) and to include the image(s) in a modified markup file, by/while accordingly modifying the scripting language code of the markup file. Both the original and the modified markup file will look identical when interpreted (rendered), but scripting languages codes will be very different. The modified markup file indeed contains a modified (and simplified) scripting language code associated with the image having been rendered. In addition, the image can be further transformed (e.g., the image can be divided, randomly or not, greyscaled, etc). This flexible "freezing" is achieved thanks to manipulation of the DOM tree of the markup file. Given a subpart of the interpreted markup file to be "frozen", the DOM tree of the markup file is analyzed. Children nodes corresponding to this subpart are defined. Then parent nodes comprising these children nodes are also defined. One parent node is chosen and the set of displayable elements corresponding to this parent node is converted to an image. The chosen parent node is replaced by a node comprising the image, thus leaving unchanged the layout of the interpreted markup file.

According to a another embodiment of the invention, there is disclosed a method to view internet content, an image being rendered at a remote proxy server from the webpage which the remote proxy server retrieves from the Internet in response to the request, the web page containing text and graphics.

According to embodiments, there is disclosed a robust proxy internet browsing method according to which the proxy server sends image data representing the site to be browsed to a standard web browser on the users machine for display, and captures mouse commands using a script running on the browser.

In an embodiment, a markup file is an HTML (hyper-text markup language) or PHP page, but it is observed that much wider cases may be envisaged. Indeed, the disclosure equally applies to other environments than the World Wide Web. It is thus intended that the scope of the invention covers all forms of electronic communications.

By definition, the disclosed technique applies for any kind of markup file, whatever is the environment. For example, the technique applies to WML pages, in mobile/wireless environments. The invention covers all known markup languages, such as XHTML (well-formed XML), DocBook, MathML, SVG, Open eBook, TEI, XBA, SGML, XML, etc., as well as other systems explicitly designed to support descriptive markup languages. It is observed that most browsers natively support a variety of formats in addition to HTML, and can be extended to support more through the use of plug-in. Similarly the disclosure can be applied to many technologies including current web interface developments: to web pages comprising Applets in Java which can be executed on web pages thanks to a JVM (Java Virtual Machine); to web pages comprising RIA (Rich Internet Applications) which can be developed in AJAX (Asynchronous JavaScript and XML) and/or by using technologies like Flash or WPF/E (requiring adapted plug-in). And at last, to web interfaces which now use RDA (Rich Desktop Applications) requiring a virtual machine (Eclipse RCP, NetBeans, Java Web Start, Mozilla XULRunner, Adobe AIR or Microsoft SmartClient) or working with technologies such as Flash/Flex/ActionScript or HTML/Javascript/CSS/AJAX. It is reminded that XUL is an XML language based on W3C standard XML 1.0. Applications written in XUL are based on additional W3C standard technologies featuring HTML 4.0; Cascading Style Sheets (CSS) 1 and 2; Document Object Model (DOM) Levels 1 and 2; JavaScript 1.5, including ECMA-262 Edition 3 (ECMAscript); XML 1.0.

According to embodiments, the described approach is not restricted to pure web environments; for example electronic messaging can implement embodiments of the invention (email clients do receive a lot of advertisements, whose effective display is intended to be secured by senders). Emails (electronic messages), since they can be in HTML format, are then also covered. According to other embodiments, the disclosure also applies to application suites rather than merely web browsers: applications also can embed advertisements. For example, advertisements can be embedded in pdf viewers (pdf is a de facto standard and advertisements can be adapted to the final user according to the context and contents of the pdf file, among other parameters). According to the paradigm SaaS/Software as a Service, software is delivered through the Internet and any software application can appear as markup files (HTML pages). Similarly, gaming environments are more and more provided with embedded advertisements. Adblocking techniques could emerge in these environments and the present disclosure would enable to secure the display of advertisements. According to embodiments, the present disclosure indeed addresses all viewers (content from a document may be rendered on a "content rendering application or device". Examples of content rendering applications include an Internet browser (e.g., Explorer or Netscape), a media player (e.g., an MP3 player, a Real Networks streaming audio file player, etc.), a viewer (e.g., an Abobe Acrobat pdf reader), etc.).

According to embodiments, the present disclosure is also very valuable to secure so-called mashups. Mashups mix and merge content (data and code) from multiple content providers in a user's browser, to provide high-value web applications. Web applications increasingly rely on extensive scripting on the client-side (browser) using a readily available client-side JavaScript libraries (and programming paradigm such as AJAX). Mashup developers typically use a web application proxy server which fetches the content from different servers and serves it to the mashup or by directly including code from different origins. By separating and gathering content, there are risks that enclosed or attached advertisements will be removed or skipped. Native security models of common browser platforms allow content to be separated, i.e., advertisements to be removed. By using the disclosed mechanism of image generation, it is possible to make content non-separable (encapsulating contents), and following to secure the display of advertisements in these mashups environment, too. Associated to these image generation techniques, further code rewriting mechanisms can use Javascript rewriting which can make a combination of static analysis and dynamic code rewriting (due to the self-modifying nature of JavaScript), operations being performed in a rewriting proxy.

More generally, the described mechanism of scripting language code reengineering in addition to the generation of images applies to any situation where a distinction can be made between visualization and programming. Image mapping/generation will always be possible through analogue capture or video buffer access. Further, the present description discloses a technique that can be applied every time the underlying programming code can be accessed (since it enables to secure revenue stream, this will be more likely the common case). If code elements (underlying program and instructions) can be accessed (for example thanks to an API), then they can be modified (even in real-time) and the proposed mechanism can secure the display of advertisements. Even if the underlying program cannot be accessed, it can be learned, simulated, anticipated, computed, etc. Following, re-programming can also be reached (a step of learning has to be added to the present range of solutions).

Advanced features that can optionally be combined with embodiments of the invention are now discussed.

DOM inspection tools are available on the market. Such tools would greatly benefit from implementing embodiments of the invention. For example, an extension of the Mozilla DOM Inspector could allow to modify and save directly markup files, according to embodiments of the invention, i.e., by converting the contents of one or a plurality of nodes into one or a plurality of images, modifying the DOM tree and including the generated image(s) directly into the modified markup file). Such a development would allow users to "freeze" (in images) parts of their documents while editing operation. Among many advantages, it would allow users to impede crawling and indexing of image-converted parts of their contents (because spiders or bots do not analyze the pixels of images). It would also allow forbidding any copy/paste operation by final viewers of contents (when markup files are delivered).

Another possible use of embodiments of the invention would consist in repairing markup files containing errors. If an error is detected (in a script for example), the conversion of the content of the node(s) containing the error into an image according to embodiments of the invention will enable to generate an error-free markup file.

Using image generation offers many interesting opportunities since it implies a possible power control on the markup file. For example, an image corresponding to a node having been rendered, it would be possible to host the image on a secure server and to require authentication and/or payment for accessing the considered image. It would then be possible to selectively secure parts of a given file with much flexibility. A similar mechanism would implement conditional access to contents or parts of contents according to rights having been previously granted to users or machines.

Aside image generation, the use of <usemap> tags is valuable. The usemap attribute points to a map which demarcates parts of the image. This allows re-encoding URLs and links, and following to control the interactivity of the document.
[00]
Regarding "node control", it would also be possible to implement fine-grained mechanisms (deciding whether a node is valid or invalid, re-encode node events, etc.). Regarding "DOM tree control", one can think about interesting possibilities. For example, a daemon or software program checking the integrity of the DOM tree of the modified and parsed markup file in order to allow (or not) the final display to the user. Such DOM tree profiles could use "signatures", for example a set of characteristics or values. It would be possible to setup "Best practices" databases, containing robust (to filtering techniques) DOM tree profiles. The control over the DOM path offers similar advantages.

Other considerations are now discussed.

Firstly, a very frequent update of data center software code (Software as a Service model) may be useful, combined with embodiments of the invention. Advertisers implementing embodiments of the invention could indeed very frequently update data center software code, which delivers contents and services to customers (for example in webmails). Then, advertisement blockers could try to learn and adapt by updating adblockers plug-ins or add-ons code accordingly, but the frequency of changes could discourage adblocking.

Secondly, handling encrypted browsing sessions (SSL for example) appears to be an interesting possibility if combined with embodiments of the invention. The idea is that in order to accept to serve contents, a service provider could check the integrity of delivered contents (and thus the display of all contents, including advertisements, would be guaranteed). Therefore, several mechanisms can be used, including the use of hash values. It is observed that adblockers could still succeed to skip ads in such environments (in webmails under https for example). The reason is that add-ons and plug-ins operate after the deciphering of contents on the client and before the final visual rendering to the user (the data transport layer is solely concerned). In other words, further filtering steps will always allow modifying contents till the very end on the client browser, unless there is set up a very final control on the user machine. In other words, encryption mechanisms are interesting to combine with the described embodiments of the invention (image encryption, etc.).

Thirdly, embodiments of the invention may be combined with serving parameters or constraints inspired by Trusted Computing mechanisms. For example, certain networks may refuse to serve web pages to non-compliant browsers. This relates to mechanisms for operating system updates for example. By verifying the use of an approved or certified client, a website site would satisfy itself that the user has been forced to view a certain number of advertisements (a possible system would check the integrity of a certified DOM tree). To the contrary, it would be possible to use a blacklist mechanism (by not serving forbidden proxies, spiders or identified proxies using non-authorized extraction, filtering, or DOM modification mechanisms or techniques). But it turn, proxy-bouncing (or data caching) techniques could enable to defeat these blacklist approaches. Yet a further countermeasure would consist in requiring a precise path for delivering contents. Concretely, a user would have to visit a predetermined path of links (which would be impossible for a bot or a spider to precisely follow) in order to be able to receive related contents (otherwise desired contents would not delivered). DOM tree modifications can be directed to take into account these aspects and rules. It would be similarly possible to create proprietary encrypted file formats which could only be read by "approved" software, and for which the decryption keys must be obtained from a network server (which keys are extremely difficult to recover by reverse engineering). Developments related to the Trusted Computing paradigm tend to take control of computer devices; the OS (deep) level may become the last level enabling the delivery of ads.

Fourthly, the rewriting of the DOM offers many interesting opportunities. For example, it would be valuable to generate a single image (and an associated very simplified DOM tree) and to use it as a background image while superposing a possible video area (in foreground, with a <DIV> tag if the markup file were an HTML markup file, i.e. an adapted DOM tree). It is possible to imagine a wide range of indirect applications, such as using an image in foreground to disable access to the fast-forward button in an embedded video player to prevent the user from skipping an advertisement in a video (this operation being made temporarily—by refresh for example—or permanently).

The invention can take form of an entirely hardware embodiment, an entirely software embodiment or an embodiment containing both hardware and software elements. In an embodiment, the invention is implemented in software, which includes but is not limited to firmware, resident software, microcode, etc. In a high performance system, a hardware implementation of the virtualization mechanism bundled with image generation processing may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, or transport the program for use by or in connection with the instruction execution system, apparatus, or device.

The invention claimed is:
1. A method of modifying a document object model (DOM) tree of an interpreted markup file comprising one or more displayable elements, the method comprising:
obtaining, using a computer device, the DOM tree of the interpreted markup file, the DOM tree comprising at least one parent node and a plurality of child nodes, each node being associated with at least one of the displayable elements;
identifying, using the computer device, in the DOM tree a set of the child nodes whose displayable elements comprise at least a part of a particular displayed area of the interpreted markup file, where in the at least the part of the particular displayed area is a subset of the displayable elements;

identifying, using the computer device, in the DOM tree a first parent node comprising the set of child nodes;

converting, using the computer device, all displayable elements associated with the identified first parent node to a master image, wherein the master image includes the at least the part of the particular displayed area;

generating, using the computer device, a second parent node comprising the master image; and modifying, using the computer device, the DOM tree into a modified DOM tree by deleting the identified set of child nodes and by replacing the identified first parent node by the second parent node.

2. The method of claim 1, further comprising:
constructing a modified markup file according to the modified DOM tree.

3. The method of claim 2, the modified markup file further comprising a scripting language code adapted to cause a user terminal upon which it is executed to transmit coordinate information defining a position of a user-controlled cursor.

4. The method of claim 3, wherein the scripting language code is further adapted to cause the user terminal upon which it is executed to transmit action information defining an action of the user-controlled cursor.

5. The method of claim 2, further comprising:
providing the master image and interpreting the modified markup file.

6. The method of claim 1, wherein the master image is further divided into a plurality of sub-images.

7. The method of claim 1, further comprising:
altering the master image or at least one of the sub-images by operations such as distorting, greyscaling, re-encoding, resizing, noising, discretizing, resampling, or scrambling.

8. The method of claim 1, wherein the markup file is an HTML, PHP or XML file.

9. A computer program stored on a non-transitory computer usable medium for modifying a document object model (DOM) tree of an interpreted markup file comprising one or more displayable elements, the computer program comprising instructions for:

obtaining the DOM tree of the interpreted markup file, the DOM tree comprising at least one parent node and a plurality of child nodes, each node being associated with at least one of the displayable elements;

identifying in the DOM tree a set of the child nodes whose displayable elements comprise at least a part of a particular displayed area of the interpreted markup file, where in the at least the part of the particular displayed area is a subset of the displayable elements;

identifying in the DOM tree a first parent node comprising the set of child nodes;

converting all displayable elements associated with the identified first parent node to a master image, wherein the master image includes the at least the part of the particular displayed area;

generating a second parent node comprising the master image; and modifying the DOM tree into a modified DOM tree by deleting the identified set of child nodes and by replacing the identified first parent node by the second parent node.

10. The computer program of claim 9, further comprising instructions for:
constructing a modified markup file according to the modified DOM tree.

11. The computer program of claim 10, the modified markup file further comprising a scripting language code adapted to cause a user terminal upon which it is executed to transmit coordinate information defining a position of a user-controlled cursor.

12. The computer program of claim 11, wherein the scripting language code is further adapted to cause the user terminal upon which it is executed to transmit action information defining an action of the user-controlled cursor.

13. The computer program of claim 10, further comprising instructions for:
providing the master image and interpreting the modified markup file.

14. The computer program of claim 9, wherein the master image is further divided into a plurality of sub-images.

15. The computer program of claim 9, further comprising instructions for:
altering the master image or at least one of the sub-images by operations such as distorting, greyscaling, re-encoding, resizing, noising, discretizing, resampling, or scrambling.

16. The computer program of claim 9, wherein the markup file is an HTML, PHP or XML file.

17. A system for modifying a document object model (DOM) tree of an interpreted markup file comprising one or more displayable elements, the system comprising:
a computer device configured to:
obtain the DOM tree of the interpreted markup file, the DOM tree comprising at least one parent node and a plurality of child nodes, each node being associated with at least one of the displayable elements;
identify in the DOM tree a set of the child nodes whose displayable elements comprise at least a part of a particular displayed area of the interpreted markup file, where in the at least the part of the particular displayed area is a subset of the displayable elements;
identify in the DOM tree a first parent node comprising the set of child nodes;
convert all displayable elements associated with the identified first parent node to a master image, wherein the master image includes the at least the part of the particular displayed area;
generate a second parent node comprising the master image; and
modify the DOM tree into a modified DOM tree by deleting the identified set of child nodes and by replacing the identified first parent node by the second parent node.

* * * * *